(No Model.)
F. VEITH.
PNEUMATIC TIRE.
No. 509,978. Patented Dec. 5, 1893.
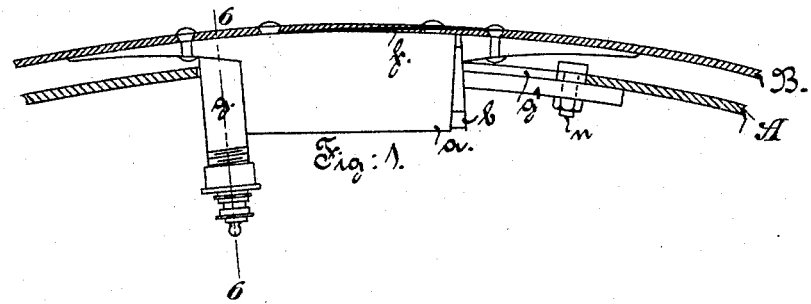
Fig: 1.
Fig: 2.
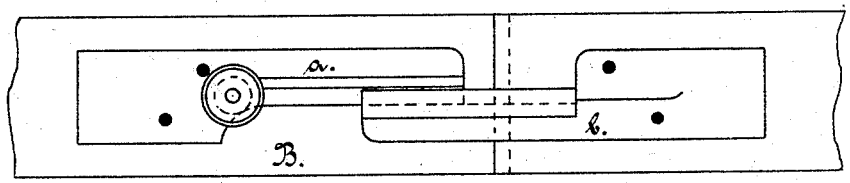
Fig: 3.
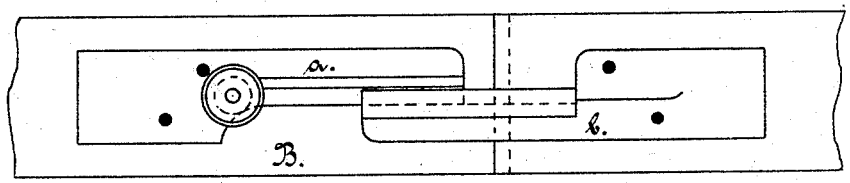
Fig: 6.
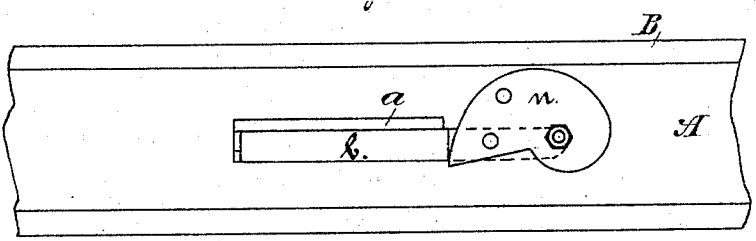
Fig: 4.
Fig: 5.
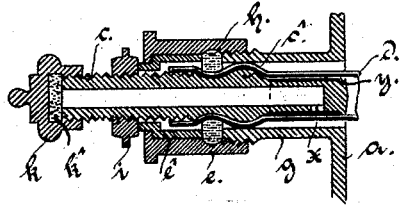
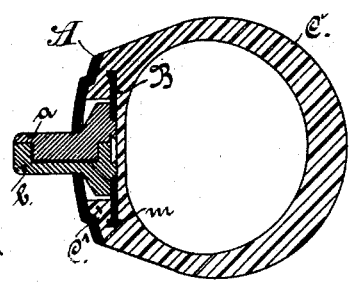
WITNESSES:
L. M. Wachschlager,
L. Fred Lang,
INVENTOR
Friedrich Veith,
BY Briesen & Knauth
his ATTORNEYS.

UNITED STATES PATENT OFFICE.

FRIEDRICH VEITH, OF KREUZNACH, GERMANY.

PNEUMATIC TIRE.

SPECIFICATION forming part of Letters Patent No. 509,978, dated December 5, 1893.

Application filed December 23, 1892. Serial No. 456,154. (No model.) Patented in Germany September 2, 1891, No. 62,255; in England September 15, 1891, No. 15,620; in France October 8, 1891, No. 216,612; in Austria-Hungary January 7, 1892, No. 3,826 and No. 44,579, and in Belgium December 30, 1892, No. 102,745.

*To all whom it may concern:*

Be it known that I, FRIEDRICH VEITH, a resident of Kreuznach, in the Kingdom of Prussia, Germany, have invented an Improvement in Pneumatic Tires, (for which I have obtained Letters Patent in the following-named countries: Germany, No. 62,255, dated September 2, 1891, and additional patent, No. 67,009, dated August 18, 1892; Great Britain, No. 15,620, dated September 15, 1891, and No. 18,095, dated October 10, 1892; France, No. 216,612, dated October 8, 1891, and additional patent, No. 216,612, dated December 2, 1892; Austria-Hungary, No. 3,826, and No. 44,579, dated January 7, 1892, and Belgium, No. 102,745, dated December 30, 1892,) of which the following is a specification, reference being had to the accompanying drawings, forming part hereof, wherein—

Figure 1 is a vertical section through the felly of a wheel showing portions of my tire in position. Fig. 2 is an under side view of the parts shown in Fig. 1, but without the felly of the wheel. Fig. 3 is an under side view of that part of the felly of the wheel which is represented in Fig. 1. Fig. 4 is a plan of a wrench used in this invention. Fig. 5 is a cross-section of the completed tire. Fig. 6 is a vertical section, on the line 6—6 Fig. 1, showing the valve arrangement.

This invention relates to certain improvements in pneumatic tires, and consists in the novel combinations of parts that are hereinafter more fully specified.

Referring to the drawings, and more particularly to Fig. 5, it will be seen that I place a distending tire B into the inner wall of the tubular pneumatic tire C by forming grooves $m\ m$ in inwardly projecting ribs $C'$ of the pneumatic tire C and inserting the distending tire B in these grooves. By this means I preserve the tubular tire C intact, having no distending tire within the same, and I place the distending tire in connection with the tubular tire by locating it in the grooved wings referred to. The letter A in Fig. 5 represents the felly of the wheel to which my tire is applied, and shows that this felly has shoulders against which the distending tire B presses the wings $C'$ of the elastic tire. In this construction, therefore, the distending tire B serves only for the purpose of distending and locating the pneumatic tire C, without being used as a means of closing any openings in the elastic tire C.

The distending tire B has (as is shown in Fig. 5) two inwardly projecting blocks $a\ b$. These blocks are utilized for the purpose of establishing a proper connection between said distending tire and the felly A, to understand which we will refer more particularly to what is represented in Figs. 1, 2 and 3. The two ends of the distending tire B are tapered and capable of overlapping, as shown in Fig. 1. One end of the tire B carries the block $a$ and the other end carries the block $b$, the two blocks abutting against one another when seen in cross-section as represented in Fig. 5. The felly A has a slot, as in Fig. 1, through which slot the blocks $a$ and $b$ extend. In one end of this slot in the felly is the pivotal support of an eccentric $n$ which is supported by said felly, the slot in the felly being marked $g'$. Where the tapered parts of the tire B overlap, an elastic packing $f$ is or may be interposed. In order to stretch the tire B properly over the felly A, I introduce the two blocks $a\ b$ through the slot $g'$ of the felly, and then by a proper wrench or analogous instrument strain these blocks in opposite directions so as to draw the tire B as tight as possible. When this has been accomplished, I turn the eccentric $n$ against the end of the block $b$ as in Fig. 3, and thereby lock the tire B in the desired position. In order to obtain a good grip on the eccentric $n$ I use the wrench D, which is shown in Fig. 4, and which has an angular opening that engages over the nut on the end of the pivot of the eccentric $n$, and has a pin at its end which is able to fit one of the holes in the eccentric. For the purpose of setting the eccentric properly I place this wrench over the nut and connect it with the pin-hole, and am then enabled to have a good grip on the eccentric and turn it against the block $b$ so as to strain the tire. When this has been done, I reverse the wrench D so as to have no further engagement with the pin-hole of the eccentric, and use it only on the nut for drawing the same tight.

The valve for filling the pneumatic tire with compressed air is more fully represented in Fig. 6, its casing being also shown in Figs. 1 and 2. This valve consists of the following parts: In the first place a short tube $g$ extends from the tire B, where the same has the block $a$, inward, passing through the felly A as in Fig. 1. Upon the threaded inner end of the pipe $g$ is fitted a cap $e$ which contains a loose inner sleeve $e'$. Within this sleeve $e'$ and within the tube $g$ is an inner tube $c$ which has an enlargement $c'$. I prefer to have a feather on the inner side of the sleeve $e'$ entering a groove in the outer side of the threaded tube $c$, but this is not represented and is not essential.

$i$ is a nut on the tube $c$ which is adapted to bear against the inner end of the sleeve $e'$, serving to push this sleeve $e'$ more or less into the casing of the valve arrangement. The inner end of the tube $c$ is ordinarily closed by a cap $k$ with intervening packing $k'$. Whenever air is to be passed through the pipe $c$ into the pneumatic tire C, the cap $k$ is detached and a hose from an air pump applied to the inner end of the pipe $c$.

$d$ is a rubber tube which is slipped over the enlarged portion of the pipe $c$ and whose outer end extends into and is vulcanized together with the pneumatic tire C. A thick rubber ring $h$ which is between the sleeve $e'$ and the tube $g$ and which is embraced by the tube $e$, serves to hold the rubber tube $d$ tightly on the pipe $c$. The more the sleeve $e'$ is forced upward—that is, toward the tire by means of the nut $i$, the more the ring $h$ will be compressed. The upper end of the pipe $c$ has an aperture $x$, clearly shown in Fig. 6. Over this aperture $x$ is placed a rubber ring $y$ which is embraced in turn by the rubber tube $d$. As long as air is being pumped into the pipe $c$, that air will crowd the ring $y$ away from the opening $x$ and will thereby be enabled to enter the rubber tube $d$ and the pneumatic tire C. But after the air-pump ceases to operate, the pressure of air within the pneumatic tire acts against the outer side of the rubber ring $y$, pressing it against the pipe $c$, thereby closing the aperture $x$. Any air which meanwhile entered between the pipe $d$ and the ring $y$ will be prevented from escaping by the compressed ring $h$.

Having described my invention, I claim—

1. The combination of the tire B carrying the blocks $a$ $b$ at its ends with the felly A having the slot $g$ and eccentric $n$, all arranged as and for the purpose herein shown and described.

2. In a valve for pneumatic tires, the combination of the pipe $g$, cap $e$, sleeve $e'$, pipe $c$ having enlargement $c'$ and aperture $x$, rubber tube $d$, compression ring $h$, rubber ring $y$ and cap $k$, all arranged substantially as and for the purpose herein shown and described.

FRIEDRICH VEITH.

Witnesses:
JEAN GRUND,
A. PARMOKE.